US011693826B2

(12) United States Patent
Schlarb et al.

(10) Patent No.: US 11,693,826 B2
(45) Date of Patent: Jul. 4, 2023

(54) LIGHTWEIGHT EXTENSION OF CORE DATA SERVICES

(71) Applicant: SAP SE, Walldorf (DE)

(72) Inventors: Uwe Schlarb, Ostringen (DE); Fabian Fellhauer, Ostringen (DE); Cornelia Haase, Walldorf (DE); Georg Wilhelm, Walldorf (DE); Timm Falter, Sinsheim-Hilsbach (DE); Mike Hirsch, Neulussheim (DE); Tobias Melcher, Diehlheim (DE); Steffen Weinstock, Waldangelloch (DE); Christian Holzer, Ubstadt-Weiher (DE); Karsten Schaser, Wiesloch (DE); Christian Fuhlbruegge, Spechback (DE); Daniel Wachs, Mutterstadt (DE); Rene Dehn, Sinsheim (DE)

(73) Assignee: SAP SE, Walldorf (DE)

( * ) Notice: Subject to any disclaimer, the term of this patent is extended or adjusted under 35 U.S.C. 154(b) by 256 days.

(21) Appl. No.: 17/073,560

(22) Filed: Oct. 19, 2020

(65) Prior Publication Data
US 2022/0121625 A1    Apr. 21, 2022

(51) Int. Cl.
*G06F 16/10* (2019.01)
*G06F 16/17* (2019.01)
*G06F 16/11* (2019.01)

(52) U.S. Cl.
CPC ........ *G06F 16/1734* (2019.01); *G06F 16/122* (2019.01)

(58) Field of Classification Search
None
See application file for complete search history.

(56) References Cited

U.S. PATENT DOCUMENTS

| 6,219,834 | B1 | 4/2001 | Soroker et al. |
| 6,996,568 | B1 | 2/2006 | Bedell et al. |
| 7,263,697 | B2 | 8/2007 | Acker et al. |
| 7,406,695 | B2 | 7/2008 | Wilhelm et al. |
| 7,505,983 | B2 | 3/2009 | Wildhagen et al. |
| 7,647,298 | B2 | 1/2010 | Adya et al. |
| 7,870,549 | B2 | 1/2011 | Acker et al. |
| 8,191,038 | B1 * | 5/2012 | Samuel ............... G06F 16/972 717/136 |
| 8,606,799 | B2 | 12/2013 | Dehn et al. |
| 9,430,523 | B2 | 8/2016 | Falter et al. |

(Continued)

OTHER PUBLICATIONS

Kindakli, "Design and Implementation of an Efficient Approach for Custom-fields and Formulas with SAP HANA" Master Thesis University of Magdeburg, 2015, 75 pages.

*Primary Examiner* — Jau Shya Meng
(74) *Attorney, Agent, or Firm* — Fish & Richardson P.C.

(57) ABSTRACT

Implementations of the present disclosure include receiving, by a parser, a view source file and an extension source file, the view source file defining a view on data stored in a database, the extension source file defining an extension to the view, parsing, by the parser, the view source file to provide a view abstract syntax tree (AST) and the extension source file to provide an extension AST, providing, by the parser, a merged AST based on the view AST and the extension AST, generating a mixed runtime data object using the merged AST, and providing the mixed runtime data object for consumption by at least one runtime component.

20 Claims, 11 Drawing Sheets

(56) References Cited

U.S. PATENT DOCUMENTS

| | | |
|---|---|---|
| 9,619,552 B2 | 4/2017 | Falter et al. |
| 10,339,040 B2 | 7/2019 | Devpura et al. |
| 10,915,304 B1 * | 2/2021 | Agarwal ............... G06F 16/245 |
| 2005/0289125 A1 * | 12/2005 | Liu ..................... G06F 16/2448 |
| 2012/0192151 A1 * | 7/2012 | Parkes ...................... G06F 8/10 |
| | | 717/120 |
| 2013/0104112 A1 * | 4/2013 | Novillo .................... G06F 8/42 |
| | | 717/151 |
| 2018/0218031 A1 * | 8/2018 | Wong ................. G06F 16/2425 |
| 2019/0278572 A1 * | 9/2019 | Yoshida .................... G06F 8/75 |
| 2019/0370375 A1 | 12/2019 | Wachs et al. |
| 2020/0349157 A1 * | 11/2020 | Gupta ................. G06F 16/243 |

\* cited by examiner

```
...
<DDLSOURCES>
  <DDDDLSRC>
    <DDLNAME>E_DD_TSM_SO_01</DDLNAME>
    ...
    <SOURCE>
       @AbapCatalog.sqlViewAppendName: 'E_DD_TSM_SOH01'
       @EndUserText.label: 'SDDL: Manual Extend on Interface View'
       extend view I_DD_TSM_SO with E_DD_TSM_SO_01
       association [0..1] to I_DD_TSM_BUPA as _FallbackBuyer on _FallbackBuyer.id = $projection.buyer_id
       {
            lifecycle_status as lifecycle_status_ext, _FallbackBuyer
       }
    </SOURCE>
    ...
  </DDDDLSRC>
  <DDDDLSRC>
    <DDLNAME>I_DD_TSM_SO</DDLNAME>
    ...
    <SOURCE>
       @AbapCatalog.sqlViewName: 'I_DD_TSM_SOH'
       @AbapCatalog.compiler.compareFilter: true
       @AbapCatalog.preserveKey: true
       @AccessControl.authorizationCheck: #CHECK
       @EndUserText.label: 'SDDL: Interface (BO) View for SO Header'
       define root view I_DD_TSM_SO
         as select from sddl_d_tsm_so as _SalesOrder composition [0..*] of I_DD_TSM_SO_I as _Items
         association [0..1] to I_DD_TSM_BUPA as _Buyer on _SalesOrder.buyer_id = _Buyer.id
         association [0..1] to I_DD_TSM_BUPA as _ShipTo on _SalesOrder.ship_to_id = _ShipTo.id
       {
         key so_key, id,
            lifecycle_status,
            ...
            _Buyer,
            _ShipTo,
            _Items
       }
    </SOURCE>
    ...
  </DDDDLSRC>
</DDLSOURCES>
```

*FIG. 5A*

```
...
<DDLSOURCES>
  <DDDDLSRC>
    <DDLNAME>E_DD_TSM_SO_02</DDLNAME>
    ...
    <SOURCE>
      @AbapCatalog.sqlViewAppendName: 'E_DD_TSM_SOH02'
      @EndUserText.label: 'SDDL: Manual Extend on Interface View'
      extend view I_DD_TSM_SO with E_DD_TSM_SO_02E { id as id_ext
      }
    </SOURCE>
    ...
  </DDDDLSRC>
  <DDDDLSRC>
    <DDLNAME>I_DD_TSM_SO</DDLNAME>
    ...
    <SOURCE>
      @AbapCatalog.sqlViewName: 'I_DD_TSM_SOH'
      @AbapCatalog.compiler.compareFilter: true
      @AbapCatalog.preserveKey: true
      @AccessControl.authorizationCheck: #CHECK
      @EndUserText.label: 'SDDL: Interface (BO) View for SO Header'
      define root view I_DD_TSM_SO
        as select from sddl_d_tsm_so as _SalesOrder composition [0..*] of I_DD_TSM_SO_I as _Items
        association [0..1] to I_DD_TSM_BUPA as _Buyer on _SalesOrder.buyer_id = _Buyer.id
        association [0..1] to I_DD_TSM_BUPA as _ShipTo on _SalesOrder.ship_to_id = _ShipTo.id
        { key so_key, id,
          lifecycle_status,
          ...
          _Buyer,
          _ShipTo,
          _Items
        }
    /</SOURCE>
    ...
  </DDDDLSRC>
</DDLSOURCES>
```

*FIG. 5B*

```
<DDLSOURCES>
  <DDDDLSRC>
    <DDLNAME>C_DD_TSM_SO</DDLNAME>
    ...
    <SOURCE>
      @AccessControl.authorizationCheck: #CHECK
      @EndUserText.label: 'Projection View SO'
      @Metadata.allowExtensions: true
      @UI: {
        headerInfo: { typeName: 'Sales Order',
            typeNamePlural: 'Sales Orders',
            title: { type: #STANDARD, value: 'SalesOrderExternalId' }
        }
      }
      define root view entity C_DD_TSM_SO
        as projection on I_DD_TSM_SO association [0..1] to c_dd_tsm_so_custom_analytics as _SalesOrderCustomData
            on _SalesOrderCustomData.SalesOrderKey = $projection.SalesOrderKey association [0..1] to C_DD_TSM_SO_VIEW_ANALYTICS as _SalesOrderAnalyticData
            on _SalesOrderAnalyticData.SalesOrderKey = $projection.SalesOrderKey redefine association _ShipTo as _ShipToPartner
            redirected to C_DD_TSM_BUPA
        { key so_key           as SalesOrderKey,
                id               as SalesOrderExternalId, lifecycle_status as LifecycleStatus, @ObjectModel.text.element: ['BuyerDescription']
                @Consumption.valueHelpDefinition: [{
                    association: '_Buyer',
                    label: 'TestValueHelp'
                }]
                buyer_id             as BuyerId,
                _Buyer.family_name   as BuyerDescription,
                ...
        }
    </SOURCE>
    ...
  </DDDDLSRC>
```

*FIG. 5C*

```
...
   <DDDDLSRC>
      <DDLNAME>E_DD_TSM_SO_03</DDLNAME>
...
      <SOURCE>
         extend view entity C_DD_TSM_SO with {
         virtual ExtendedShipToId: sddl_tsm_bupa_id
         }
      </SOURCE>
      ...
   </DDDDLSRC>
   <DDDDLSRC>
      <DDLNAME>E_DD_TSM_SO_04</DDLNAME>
      ...
      <SOURCE>
         @AbapCatalog.sqlViewAppendName: 'SQL_VIEW_APPEND_NAME'
         @EndUserText.label: 'SDDL: Manual Classic Extend Projection'
         extend view C_DD_TSM_SO with E_DD_TSM_SO_04
         {
            I_DD_TSM_SO.quantity_sum      as QuantitySum,
            I_DD_TSM_SO.uom_sum           as UnitOfMeasure, _ShipToPartner.familyName as ShipToPartnerFamilyName
         }
      </SOURCE>
      ...
   </DDDDLSRC>
</DDLSOURCES>
```

LIGHTWEIGHT EXTENSION OF CORE DATA SERVICES

BACKGROUND

Software systems can be provisioned by software vendors to enable enterprises to conduct operations. In some instances, software systems can include or operate in association with a database system. In general, database systems provide for storage, organization, and analysis of large volumes of data. A database system employs fundamental data definitions and processing based on a relational model, where a data definition defines a data type with metadata associated therewith. A data definition can provide a database structure (e.g., columns, tables). In some instances, a query language is used to define, read, and manipulate data within a database system.

Software systems can include various applications that provide functionality for execution of enterprise operations. Applications can be provided in an application layer that overlies a database system and enable interactions with the database system (e.g., reading data, writing data, manipulating data). In some instances, applications provided by a software vendor leverage data models (e.g., entity-relationship models (ERMs)), which provide semantics on the underlying data and ease consumption of the software system by the user. At a high level, data models enable consistent definition and formatting of database contents and sharing of data across disparate applications.

With the advent of more powerful database systems, the power of the database system is leveraged to achieve a so-called code-to-data approach (also referred to as code pushdown approach), which moves the data model and calculations from the application-level to the database-level. In this manner, data-intensive calculations are performed within the database system and movement of data to application servers is avoided. To take advantage of the code pushdown approach, data modeling infrastructures are introduced. Data modeling infrastructures provide capabilities including, but not limited to, support for conceptual modeling and relationship definitions, built-in functions, and extensions. In some examples, views can be defined, which provide views on data within the database system. At runtime, a view is parsed to provide a view abstract syntax tree (AST), which is used to generate runtime data objects that are leveraged by one or more runtime components for accessing data within the database system.

As the code-to-data approach developed, extensions to data modeling infrastructures have been introduced. In this manner, enterprises are able to extend the software systems to address custom scenarios (e.g., scenarios not addressed or only partially addressed by pre-defined views). In executing such extensions, extension ASTs are generated, which are completely decoupled from the respective view ASTs. That is, for a view having an extension, both a view AST and an extension AST are provided. This results in consumption of technical resources (e.g., processors, memory) to provide both the view AST and the extension AST, as well as a multiplicity of runtime data objects being generated, which consumes further technical resources. Accordingly, traditional approaches in provisioning extensions are inefficient in terms of technical resources expended.

SUMMARY

Implementations of the present disclosure are directed to extending data models in database systems. More particularly, implementations of the present disclosure are directed to time- and resource-efficient execution of data model extensions to provide runtime data objects using merged abstract syntax trees (ASTs).

In some implementations, actions include receiving, by a parser, a view source file and an extension source file, the view source file defining a view on data stored in a database, the extension source file defining an extension to the view, parsing, by the parser, the view source file to provide a view abstract syntax tree (AST) and the extension source file to provide an extension AST, providing, by the parser, a merged AST based on the view AST and the extension AST, generating a mixed runtime data object using the merged AST, and providing the mixed runtime data object for consumption by at least one runtime component. Other implementations of this aspect include corresponding systems, apparatus, and computer programs, configured to perform the actions of the methods, encoded on computer storage devices.

These and other implementations can each optionally include one or more of the following features: the mixed runtime data object includes at least one runtime data object entry and a query view; generating a mixed runtime data object is executed by a data dictionary of an application server; actions further include storing the merged AST and the mixed runtime data object in a database system; actions further include executing an application including the at least one runtime component using the merged AST and the runtime data object at an application server, and receiving, by presentation logic, a result from the application server; actions further include generating a view AST based on the view source file, generating an extension AST based on the extension source file; actions further include merging, by the parser, the extension AST into the view AST to provide the merged AST; and actions further include identifying a node on the view AST syntactically based on the extension AST, and merging the extension AST into the view AST the through the identified node to derive the merged AST.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to extending data models in database systems. More particularly, implementations of the present disclosure are directed to time- and resource-efficient execution of data model extensions to provide runtime data objects using merged abstract syntax trees (ASTs). Implementations can include actions of receiving, by a parser, a view source file and an extension source file, the view source file defining a view on data stored in a database, the extension source file defining an extension to the view, parsing, by the parser, the view source file to provide a view abstract syntax tree (AST) and the extension source file to provide an extension AST, providing, by the parser, a merged AST based on the view AST and the extension AST, generating a mixed runtime data object using the merged AST, and providing the mixed runtime data object for consumption by at least one runtime component.

Implementations of the present disclosure are described in further detail with reference to an example database system. The example database system is provided as the SAP HANA in-memory database system provided by SAP SE of Walldorf, Germany. An example software system executing with SAP HANA includes S/4 HANA, which can be described as a large-scale enterprise resource planning (ERP) system. SAP HANA can be described as a data platform that processes transactions and analytics at the same time on any data type, with built-in advanced analytics and multi-model data processing engines.

More particularly, SAP HANA is an in-memory database system. In some examples, an in-memory database system can be described as a database system that uses main memory for data storage. In some examples, main memory includes random access memory (RAM) that communicates with one or more processors (e.g., central processing units (CPUs)), over a memory bus. In-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. While SAP HANA is used as an example herein, it is contemplated, however, that implementations of the present disclosure can be realized in any appropriate database system.

Implementations of the present disclosure are also described in further detail herein with non-limiting reference to systems, components, data modeling tools, and the like provided by SAP SE. It is contemplated that implementations of the present disclosure can be realized using any appropriate systems, components, data modeling tools, and the like.

To provide further context for implementations of the present disclosure, and as introduced above, software systems can be provisioned by software vendors to enable enterprises to conduct operations. In some instances, software systems can include or operate in association with a database system, such as SAP HANA introduced above. In general, database systems provide for storage, organization, and analysis of large volumes of data. A database system employs fundamental data definitions and processing based on a relational model, where a data definition defines a data type with metadata associated therewith. A data definition can provide a database structure (e.g., columns, tables). In some instances, a query language (e.g., the Structured Query Language (SQL)) is used to define, read, and manipulate data within a database system.

Software systems can include various applications that provide functionality for execution of enterprise operations. Applications can be provided in an application layer that overlies a database system and enable interactions with the database system (e.g., reading data, writing data, manipulating data). In some instances, applications provided by a software vendor leverage data models (e.g., entity-relationship models (ERMs)), which provide semantics on the underlying data and ease consumption of the software system by the user. At a high level, data models enable consistent definition and formatting of database contents and sharing of data across disparate applications.

In traditional arrangements, data modeling tools (e.g., such as tools included with SAP NetWeaver Application Server (SAP NetWeaver AS) ABAP, also provided by SAP SE) can be used with applications at the application-level to provision data models (e.g., the ABAP data dictionary (DDIC), which stores definitions of objects, such as database tables and views). In such traditional arrangements, data models are defined and consumed on the application server. As such, data is retrieved from the database system and calculations on the data are executed at the application-level (i.e., on the application server). This can require movement of relatively large volumes of data back-forth between the application server and the database system.

With the advent of more powerful database systems, such as in-memory database systems including SAP HANA, the power of the database system is leveraged to achieve a so-called code-to-data approach (also referred to as code pushdown approach), which moves the data model and calculations from the application-level to the database-level. In this manner, data-intensive calculations are performed within the database system and movement of data to application servers is avoided.

To take advantage of the code pushdown approach, data modeling infrastructures are introduced. As a non-limiting example, Core Data Services (CDS), provided by SAP SE, was introduced to enable definition and consumption of data models on the database server (database-level) rather than on an application server (application-level). Data modeling infrastructures, such as CDS, provide capabilities including, but not limited to, support for conceptual modeling and relationship definitions, built-in functions, and extensions. In some instances, a data modeling infrastructure can be implemented at the application-level, enabling developers to work in application-level development tools, while the execution of resulting code is pushed down to the database-level (hence, referred to as code-to-data or code pushdown).

In some examples, CDS enables views (CDS Views) to be defined, which provide views on data within the database system. At runtime, a view is parsed to provide a view abstract syntax tree (AST), which is used to generate runtime data objects that are leveraged by one or more runtime components for accessing data within the database system.

As the code-to-data approach developed, extensions to data modeling infrastructures have been introduced. With non-limiting reference to S/4 HANA and in the SAP Cloud Platform ABAP Environment, CDS Views, which are delivered by SAP SE, can be extended using CDS Extends to provide extended CDS Views. Using CDS Extends, enterprises are able to extend the software systems to address custom scenarios (e.g., scenarios not addressed or only partially addressed by pre-defined CDS Views). In executing such extensions, extension ASTs are generated, which are completely decoupled from the respective view ASTs. That is, for a view having an extension, both a view AST and an extension AST are provided. This results in consumption of technical resources (e.g., processors, memory) to provide both the view AST and the extension AST, as well as a multiplicity of runtime data objects being generated, which consumes further resources. Accordingly, traditional approaches in provisioning extensions are inefficient in terms of technical resources expended.

In view of the above context, implementations of the present disclosure provide time- and resource-efficient execution of data model extensions to provide runtime data objects using merged abstract syntax trees (ASTs). More particularly, and as described in further detail herein, implementations of the present disclosure reduce a number of ASTs and corresponding runtime data objects to reduce technical resources expended in provisioning extensions.

Figure 1:
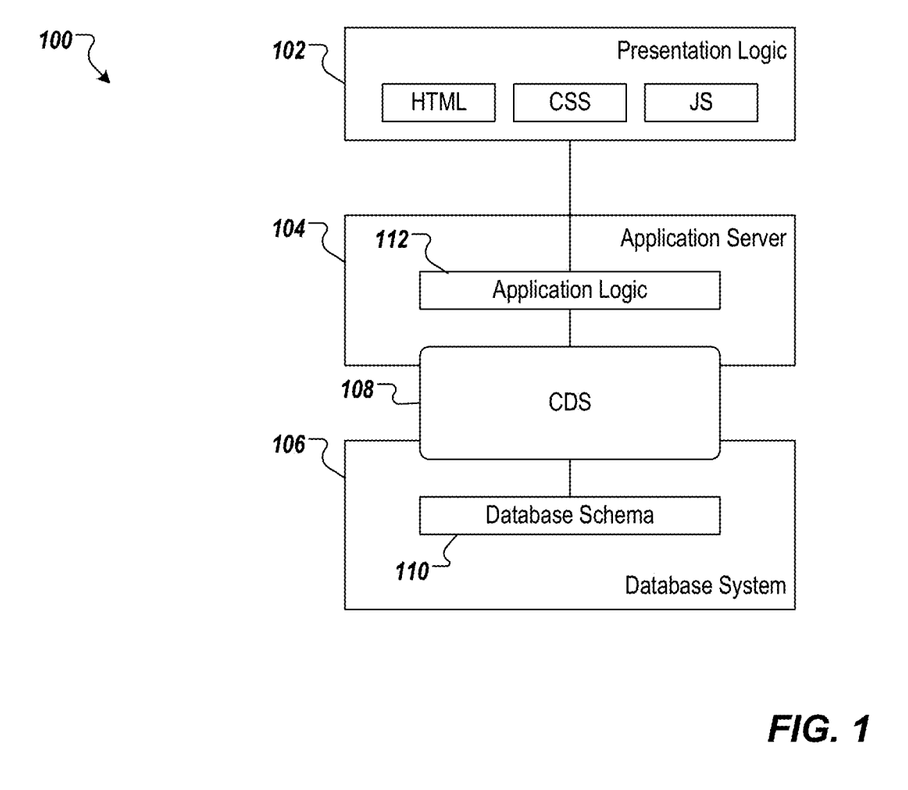
FIG. 1 depicts an example high-level architecture that can be used to execute implementations of the present disclosure.

FIG. 1 depicts an example architecture 100 in accordance with implementations of the present disclosure. In the depicted example, the example architecture 100 includes a presentation logic layer 102, an application server layer 104 and a database system layer 106. The presentation logic layer 102 is coupled to the application server 104 and CDS 108, referenced here as a non-limiting example, functionally spans the application server 104 and the database system 106. For example, the CDS 108 can provide one or more development tools at the application server layer 104 that can be used to develop view extensions that are processed to provide runtime data objects in the database system layer 106.

The database system layer 106 includes calculation logic (not shown) that is designed to interact with data stored therein. The calculation logic of the database system 106 can be performed by various engines (e.g., SQL engine, calculation engine, SQL script) to provide data definition and processing based on a database schema 110 in view of a relational model. The data definition includes, but is not limited to, defining of data types, associated metadata, and the database structure (e.g. columns, tables). In some implementations, the application layer 104 executes functionality for communication with the database system 106 (e.g., using SQL statements).

In further detail, the application server 104 includes application logic 112, which can implicate CDS views and extensions, as described herein. In some implementations, the application logic 112 of the application server 104 can be implemented using any appropriate programming language (e.g., River Definition Language (RDL), JavaScript (JS)). In some examples, the application logic 112 references model concepts, such as entities and relationships, that are not reflected in the basic syntax of a query language (e.g., SQL). In some examples, the application logic 112 can include common languages for defining and consuming data across different containers (e.g., ABAP, Java).

As discussed in further detail herein, the CDS 108 functionally spans the application server layer 104 and the database system layer 106. The CDS 108 can include a common set of domain-specific languages (DSL) and services or applications which provides functionalities. The CDS 108 enables defining and consuming semantically rich data models as an integral part of the database system 106, such that data-intensive calculations can be pushed down to the database system layer 106. As a result, the development of functionality of services/applications and related data models (e.g., data sets and data entities) can executed at the application server layer 104, and calculations and data access can be executed at the database system layer 106.

The presentation logic layer 102 is coupled for communication with the application server layer 104 and presents content received from the application server layer 104 to clients. For example, the presentation layer 102 can generate one or more user interfaces (UIs) that enable users to interact with the application server layer 104 (e.g., provide input to and receive output from the application logic 112). The UIs can be provided using any appropriate technology (e.g., Hypertext Markup Language (HTML), cascading style sheets (CSS), Java Script (JS)) and/or a variety of UI technologies.

Figure 2:
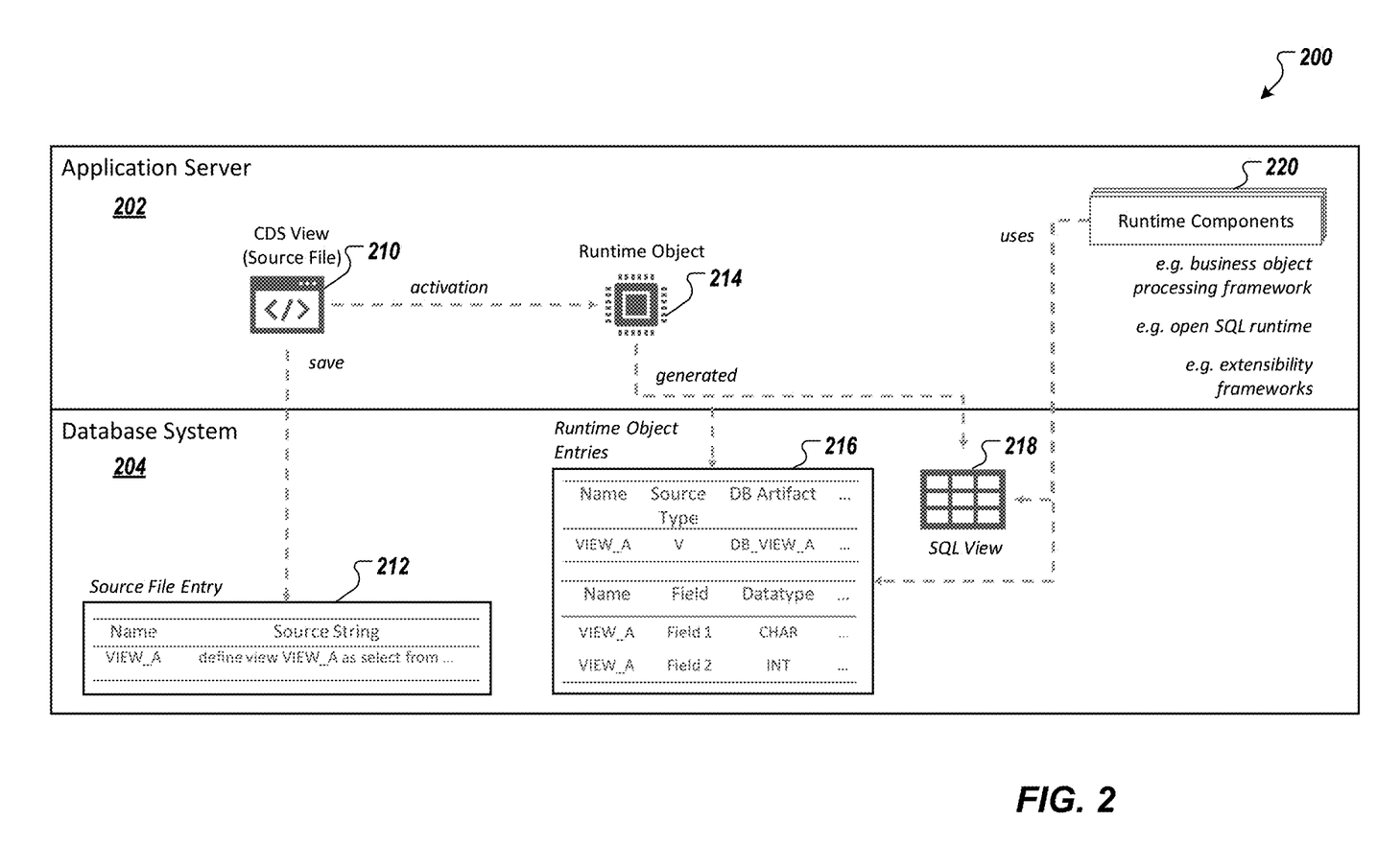
FIG. 2 depicts an example process for generating runtime data objects based on views.

FIG. 2 depicts an example process 200 for generating runtime data objects based on CDS views. The example process 200 of FIG. 2 is representative of CDS functionality spanning an application server 202 (e.g., of the application server layer 104 of FIG. 1) and a database system 204 (e.g., of the database system layer 106 of FIG. 1) for defining and consuming semantic data models on the application server 202. The data models can be constructed based on the data definition language (DDL) and the data control language (DCL) (e.g., each managed by the DDIC of CDS). In some examples, a view (CDS View in the example context) can be defined as a source file based on the DDL and the DCL. As depicted in FIG. 2, as a source file 210 defining a CDS is created at the application server 202 and is saved in the database system 204 in the form of a source file entry 212.

During execution of application logic (e.g., the application logic 112 of FIG. 1), the source file 210 can be read for activation of the CDS View defined therein. In some examples, and as described in further detail herein, activation of the CDS View can be performed by a parser that provides an AST and a DDIC that provides a runtime data object 214 based on the AST. The runtime data object 214 can be used to provide runtime data object entries 216 and a SQL view 218 (i.e., the CDS View) during runtime (i.e., execution of the application logic). The runtime data object entries 216 and the SQL view 218 are generated within the database system 204. During runtime, metadata can be generated and/or associated with the runtime data object entries 216. The SQL view 218 is a query view and some functions (e.g., the "select" function) can also be done based on the SQL view 218 during runtime.

In some examples, runtime components 220 (e.g., business object processing framework, open SQL runtime, extensibility frameworks) consume the runtime data objects 214 during runtime. As a result, when a client wishes to make use of applications including one or more runtime components 220, the application server 202 generates the runtime data objects 214 for generation of corresponding entries and views in the database system 204 and consumption of runtime components 220.

In some implementations, the data models defined in the existing CDS views (e.g., the CDS views defined in source files 210) does not meet requirements of an enterprise (e.g., a company using software systems provisioned by a software vendor). For example, and as described herein, a set of views can be provided by the software vendor, as pre-defined views. However, the pre-defined views might not meet the requirements of the enterprise. Consequently, and as described herein, the enterprise can extend a view to provide an extended view. That is, for example, the enterprise can access one or more development tools to develop extension views stored in respective source files. With continued non-limiting reference to S/4 HANA and in the SAP Cloud Platform ABAP Environment, CDS Views, which are delivered by SAP SE, can be extended using CDS Extends to provide extended CDS Views. Using CDS Extends, enterprises are able to extend the software systems to address custom scenarios (e.g., scenarios not addressed or only partially addressed by pre-defined CDS Views).

Figure 3:
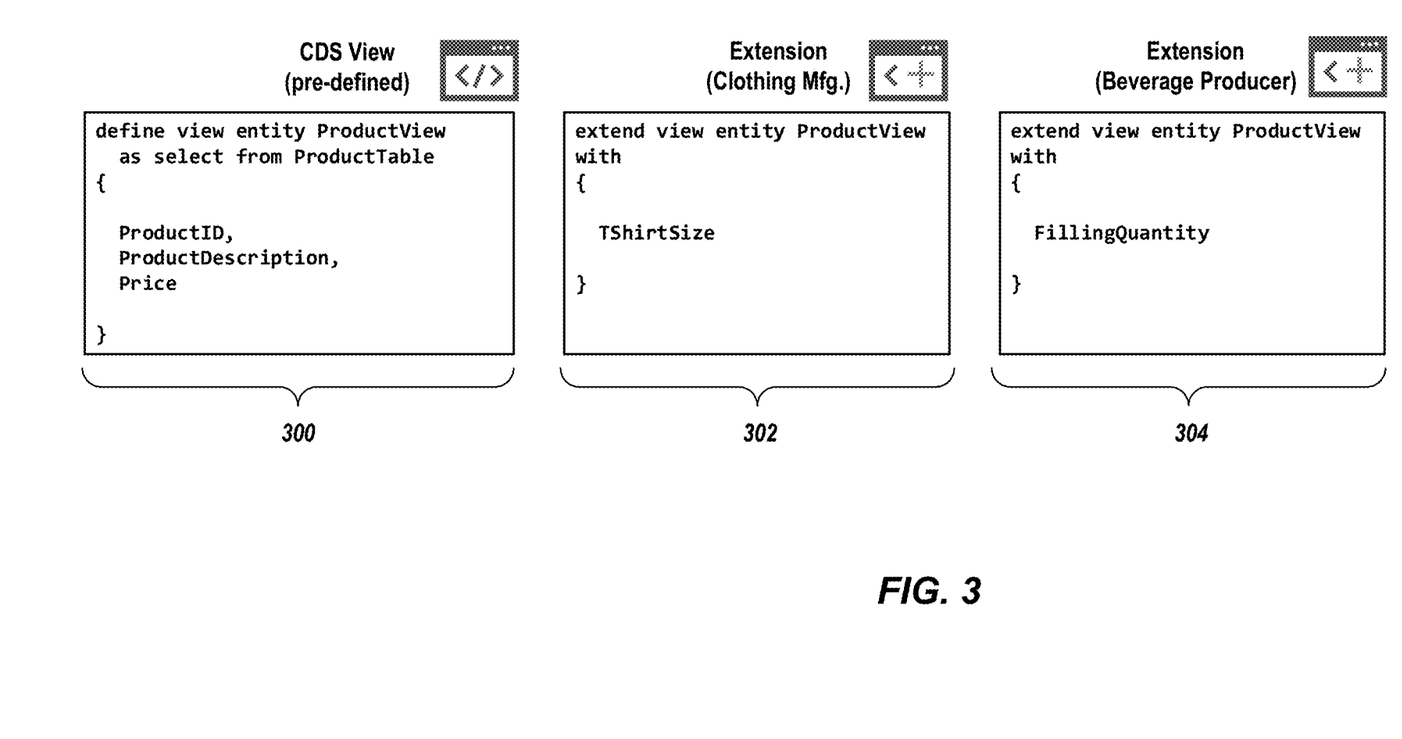
FIG. 3 depicts an example pre-defined view and example view extensions that can be applied to provide respective extended views.

FIG. 3 depicts an example pre-defined view 300 (e.g., CDS View) and example view extensions 302, 304 that can be applied to provide respective extended views (e.g., extended CDS views). In the example of FIG. 3, the pre-defined view 300 is a product view (ProductView) on a product and product data is selected from a table (ProductTable) based on an underlying data definition. That is, the pre-defined view defines data that is to be retrieved for products using product-related data with fields of product ID, product description, and price, in the depicted example. The pre-defined view 300 can be pre-fined by the software (e.g., SAP SE) and can be used by an enterprise.

As noted above, enterprises may have particular requirements that pre-defined views do not meet. Consequently, enterprises can be provided with the ability to develop view extensions. In the example of FIG. 3, the view extension 302 can be developed by a first enterprise (e.g., a clothing manufacturer) that uses a database system (e.g., the database system 204 of FIG. 2) to manage data regarding clothing products. For example, the size of T-shirts can be a requirement for the first enterprise to present as product information. However, T-shirt size is not an information field defined in the pre-defined view 300. As a result, first enterprise is able to use development tools (e.g., CDS Extends) to develop the view extension 302 that extends the pre-defined view 300 to include a field for "TShirtSize" with the fields already provided in the pre-defined view 300. As another example, a second enterprise (e.g., a beverage producer) may also have a similar problem that the pre-defined view 300 does not meet all of its requirements. For example, the second enterprise may need information of filling quantity to be viewed together with other product information. Consequently, the second enterprise can develop the view extension 304 that extends the pre-defined view 300 to include a field for "FillingQuantity." Each of the view extensions is stored as a respective extension source file.

As introduced above, runtime data objects are generated based on the views and view extensions for consumption by runtime components (e.g., the runtime components 220 of FIG. 2). The view (e.g., CDS View) and a view extension are each parsed by a parser to provide a view AST and an extension AST. In a traditional approach, for an extended view (i.e., a view with an extension), a mixed type view AST of the pre-defined view and the extension view, and a standalone extension AST would be generated. However, these two ASTs need to be interpreted together by the DDIC to provide metadata for the runtime components. Complex calculations caused by interpreting these two ASTs may lead to long generation time of the runtime data objects.

Further, some runtime components do not use the generated runtime data objects of the DDIC, but only to interpret the separate extension AST. Such runtime components need to handle these different ASTs and it is difficult for developers to maintain the corresponding code base. Also, if a view is extended by more than one extension, the related runtime components must parse each of the extensions individually. In addition, the parser of must maintain syntax features of the extension of the view twice, one in the mixed AST and another in the standalone AST. All this results in longer development times of the runtime data objects and inefficient use of technical resources. Further, the DDIC generates runtime data objects based on the ASTs. In the traditional approach, the view extensions result in generation of a mixed runtime data object (i.e., view+extension) and an extended runtime data object (i.e., extension). That is, multiple runtime data objects are generated, which is also inefficient in terms of technical resources expended.

Figure 4:
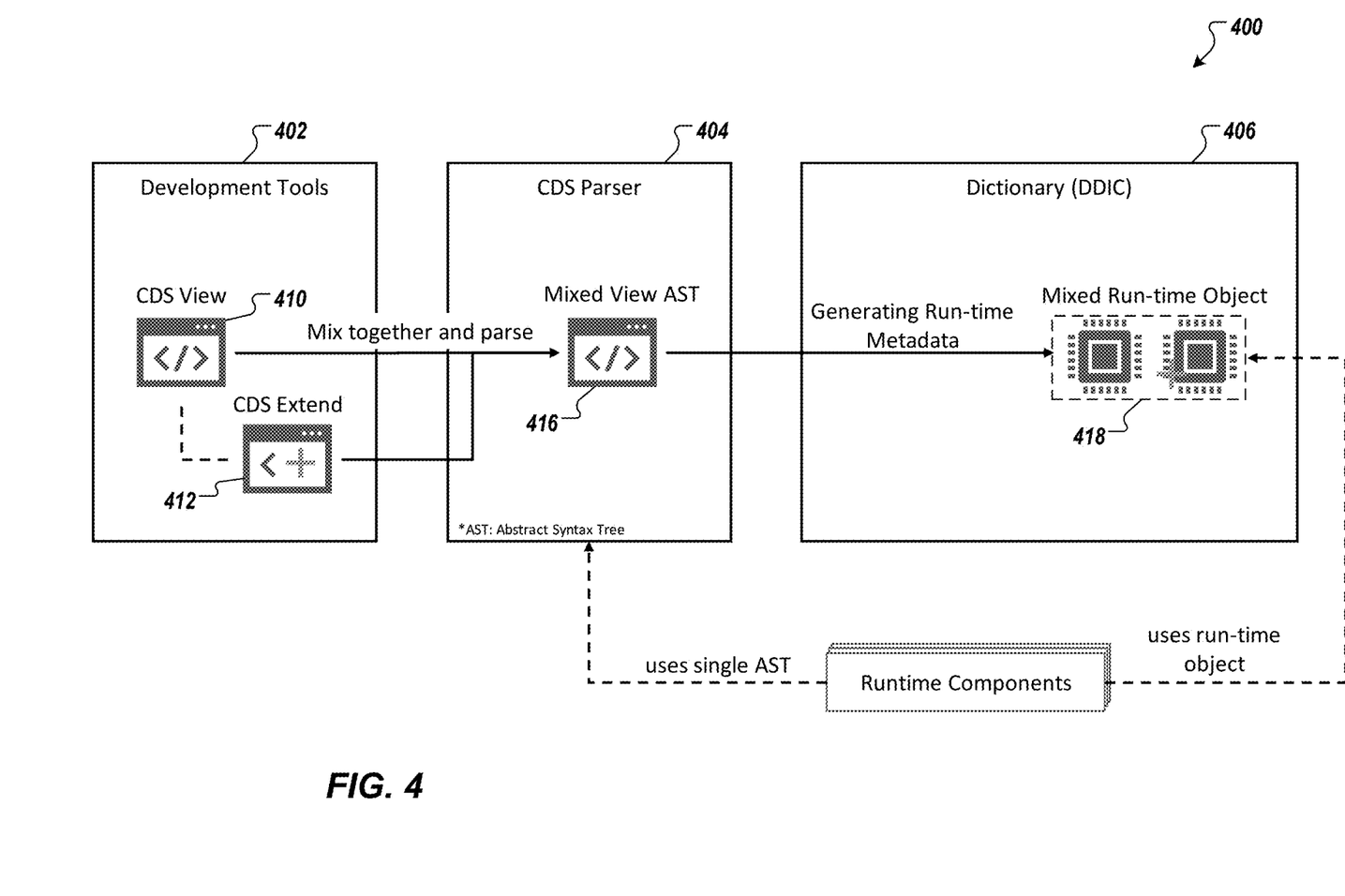
FIG. 4 depicts an example process of generating runtime data objects based on a view and a view extension in accordance with implementations of the present disclosure.

FIG. 4 depicts an example process 400 of generating runtime data objects based on a view and a view extension in accordance with implementations of the present disclosure. As depicted in FIG. 4, during development, one or more development tools 402 are used to provide, for a view (e.g., a pre-defined CDS View) provided in a view source file 410, a view extension (e.g., CDS Extend) provided in an extension source file 412. In some examples, the view source file 410 and the extension source file are provided together to a parser 404 (e.g., CDS parser). When the parser 404 receives the source files 410, 412, the parser 404 parses the view source file 410 to provide a view AST and parses the extension source file 412 to provide an extension AST. The parser 404 merges the view AST and the extension AST to provide a single AST 416, referred to herein as a merged view AST or a mixed view AST.

In some examples, each AST can be described as a tree representation of content an underlying source file and includes nodes and edges connecting nodes. For example, each AST can include a root node down to one or more leaf nodes with one or more intermediate nodes defined along one or more paths from the root node to at least some of the one or more leaf nodes. In some examples, the root node and any intermediate nodes represent operators and leaf nodes represent operands (e.g., values). In some implementations, the parser 404 identifies nodes of the view AST that match nodes of the view AST (e.g., based on the syntax features of the nodes). If a node of the view AST matches a node of the extension AST, the matched nodes can be identified as merge points for merging the ASTs. For example, the parser 404 merges the extension AST into the view AST through the matched nodes. Merging can include adding the lead nodes of the node of the extension AST as leaf nodes of the node of the view AST. As a result, the extension AST is syntactically mixed into the view AST and the mixed view AST (merged AST) is provided. When the DDIC 406 receives the merged AST from the parser 404, the DDIC 406 generates the mixed runtime data object based thereon. In this manner, and contrary to the traditional approach described above, only a single AST (i.e., the merged AST) is provided for use of the runtime components and only a single mixed runtime data object is provided. This results in efficiency gains in terms of technical resources (e.g., fewer CPU cycles are expended to generate one runtime data object as opposed to multiple runtime data objects, less memory is required to store a single runtime data object and AST than to store multiple runtime data objects and ASTs).

Figure 5A:
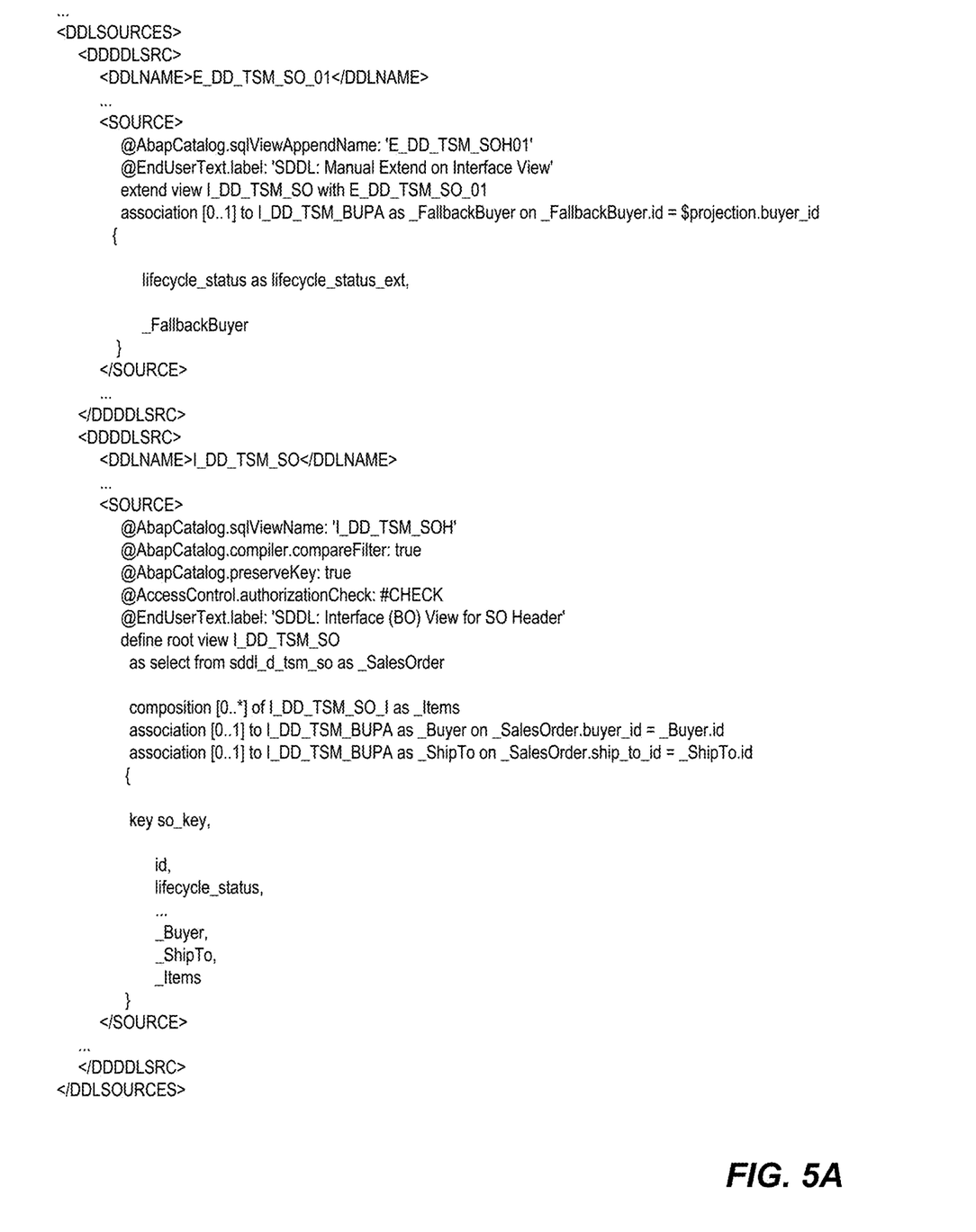
FIGS. 5A and 5B depict examples of extensions created on a view using a traditional approach.
Figure 5B:
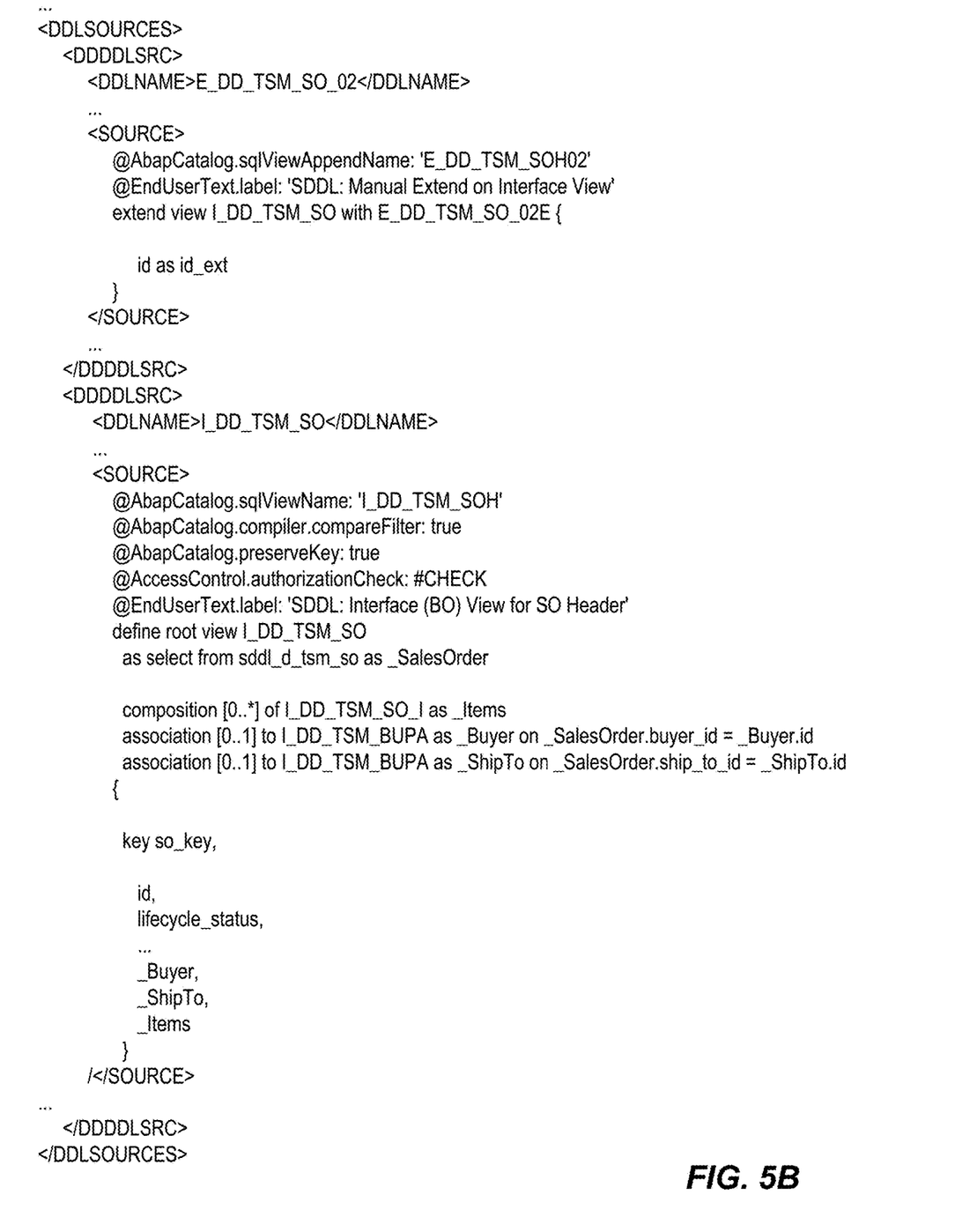
Figure 5C:
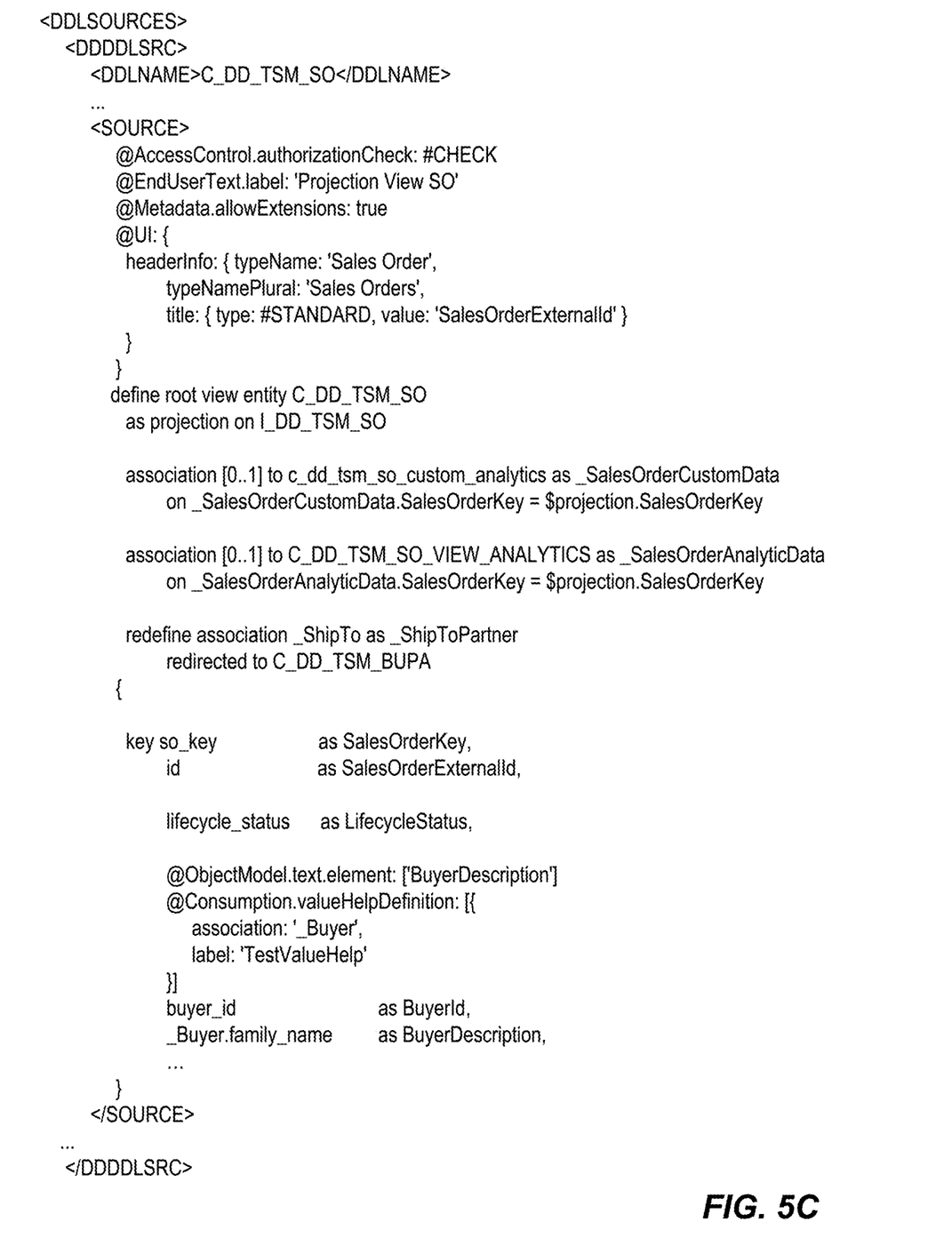
FIG. 5C depicts an example of a combined input provided to a parser in accordance with implementations of the present disclosure.
Figure 5D:
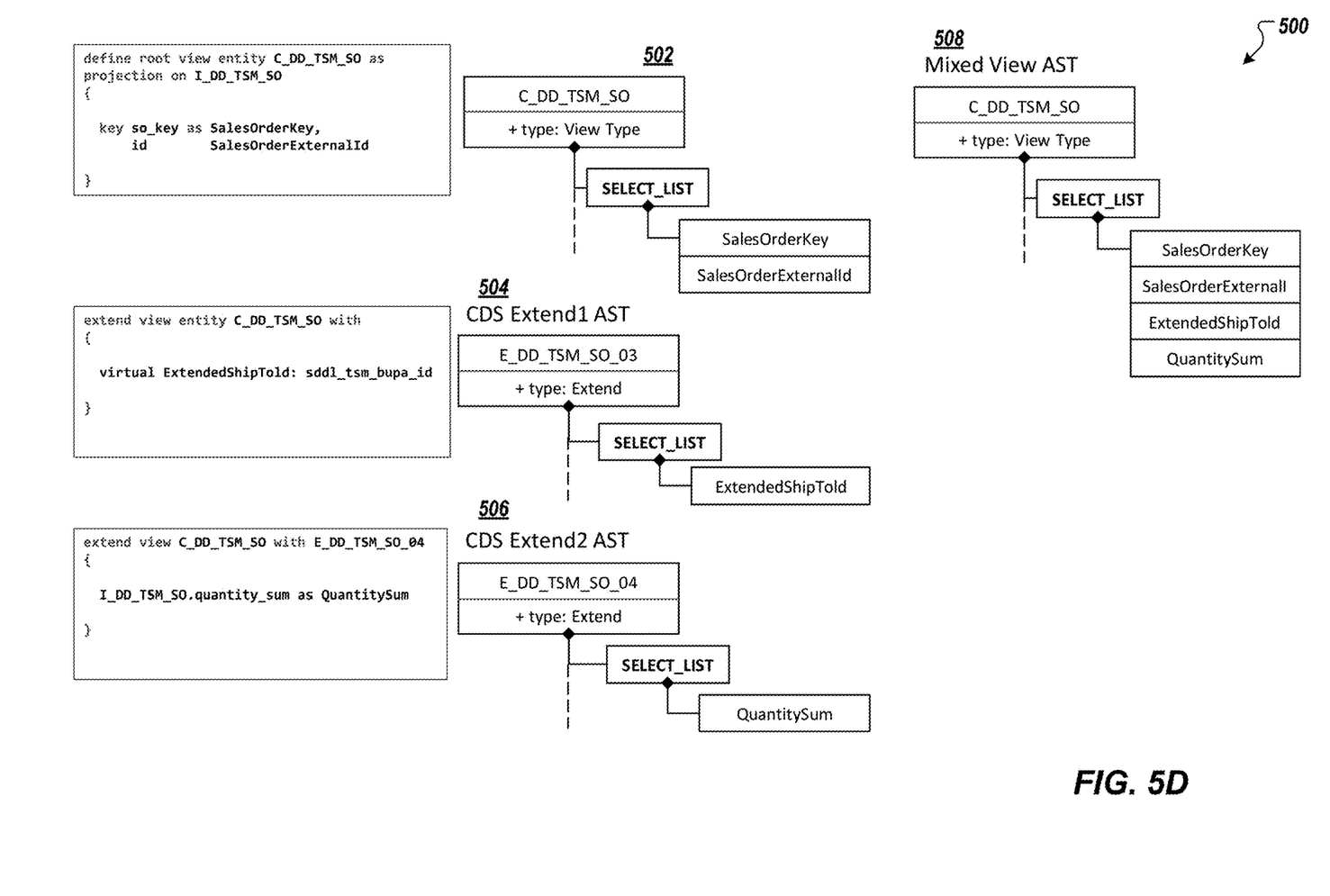
FIG. 5D depicts a process of finding matches and copying related abstract syntax tree (AST) nodes to provide a mixed view AST in accordance with implementations of the present disclosure.

In some implementations, the merged view AST is processed by the DDIC 406 using a visitor pattern, as described in further detail herein with reference to FIG. 5D. The DDIC 406 defines which properties are extracted from a specific AST node, by defining a visitor method. This visitor method is invoked dynamically based on the AST node type (e.g., class instance) as well as a defined mapping table inside the visitor. All relevant object nodes are visited and transformed into table records with cross references, referred to as stack code. These table records are used to extract relevant metadata for design time metadata tables, as well as to build up a runtime object. The runtime object itself is an optimized binary large object (BLOB) that is stored inside the database. Further, the runtime object is cached inside the application server and contains only metadata that is necessary for the runtime execution (e.g., data types, client dependencies, fieldnames).

FIGS. 5A and 5B depict examples of extensions created on a view using a traditional approach, which implementations of the present disclosure improve on. In the example of FIGS. 5A and 5B, multiple invocations are necessary to calculate the standalone extension AST's. The result sets of the inputs shown in FIGS. 5A and 5B are used to visit each extension AST, in order to generate the respective extension runtime object. Further, the runtime object of the extended view needs to be generated by visiting the view AST as well as each extension AST. The metadata that is extracted by visiting is merged into the runtime object of the extended view. However, this is very slow, as the runtime drastically increases with each extend.

FIG. 5C depicts an example of input provided to the parser 404 in accordance with implementations of the present disclosure. This input is a combination of the CDS View source and multiple CDS Extend sources. In contrast to the examples of FIGS. 5A and 5B, in which mixed sources of the CDS View and a single CDS Extend are provided to the parser 404 in sequential steps, FIG. 5C depicts the mixed input of the CDS View source along with multiple CDS Extend sources to the same CDS View in a single step. This combined input is used by the parser 404 to generate the mixed view AST 416 in accordance with implementations of the present disclosure. For the example input of FIG. 5C, the parser 404 first creates individual ASTs, referred to as, for example, "CDS View AST," 502 (a view AST) "CDS Extend1 AST" 504 (a view extension AST), and "CDS Extend2 AST" 506 (a view extension AST). This is depicted in FIG. 5D. The parser 404 iterates through the nodes of each of the extension ASTs 504, 506 looking for nodes equivalent to the node types (e.g., "SELECT_LIST") of the view AST 502. Sub-nodes (child nodes) of matching nodes (e.g., "ExtendedShipTold" and "QuantitySum") are copied to the equivalent node of the view AST 502, while maintaining their source of origin. A process 500 of finding matches and copying related Extend AST nodes results in the merged view AST 508 is shown in FIG. 5D.

Figure 6:
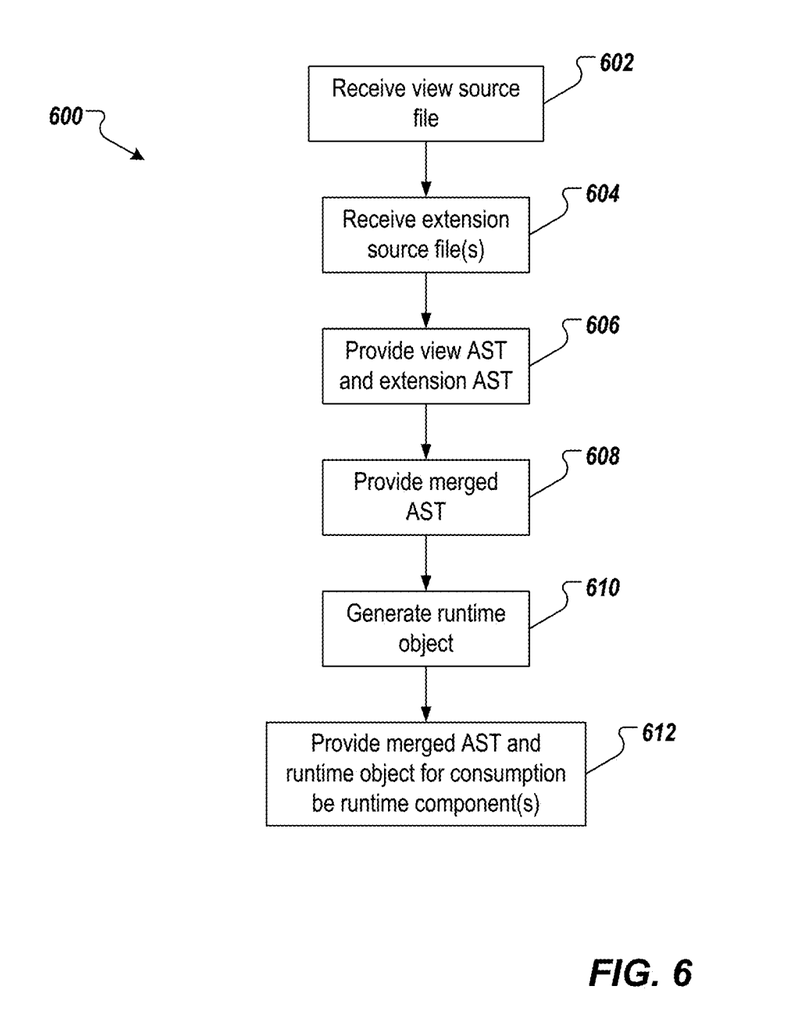
FIG. 6 depicts an example process that can be executed in accordance with implementations of the present disclosure.

FIG. 6 depicts an example process 600 that can be executed in accordance with implementations of the present disclosure. In some examples, the example process 600 is provided using one or more computer-executable programs executed by one or more computing devices.

A view source file is received (602). For example, and as described herein with reference to FIG. 4, during development, one or more development tools 402 are used to provide, for a view (e.g., a pre-defined CDS View) a view source file 410. In some examples, the view source file is stored in a database system (e.g., the database system 204 of FIG. 2). One or more extension source files are received (604). For example, and as described herein, a view extension (e.g., CDS Extend) is provided in an extension source file 412 from one or more development tools 402. In some examples, the one or more extension source files are stored in a database system (e.g., the database system 204 of FIG. 2).

A view AST and one or more extension ASTs are provided (606). For example, and as described herein, the view source file 410 and the extension source file 412 are provided together to the parser 404 (e.g., CDS parser). When the parser 404 receives the source files 410, 412, the parser 404 parses the view source file 410 to provide a view AST and parses the extension source file 412 to provide an extension AST. A merged AST is provided (608). For example, and as described herein, the parser 404 merges the view AST and the extension AST to provide a merged view AST 416. As described in further detail with reference to FIG. 5D, the parser 404 iterates through the nodes of each of the view extension ASTs to identify nodes equivalent to the node types (e.g., "SELECT_LIST") of the view AST, and sub-nodes (child nodes) of matching nodes (e.g., "ExtendedShipTold" and "QuantitySum") are copied to the equivalent node of the view AST to provide the merged view AST 508

A runtime object is generated (610). For example, and as described herein, the merged view AST is processed by the DDIC 406, which defines properties that are extracted from a specific AST node, by defining a visitor method. This visitor method is invoked dynamically based on the AST node type (e.g., class instance) as well as a defined mapping table inside the visitor. All relevant object nodes are visited and transformed into table records with cross references, referred to as stack code. These table records are used to extract relevant metadata for design time metadata tables, as well as to build up a runtime object. The runtime object itself is an optimized BLOB that is stored inside the database. Further, the runtime object is cached inside the application server and contains only metadata that is necessary for the runtime execution (e.g., data types, client dependencies, fieldnames). The merged AST and the runtime object are provided for consumption by one or more runtime components (612).

Figure 7:
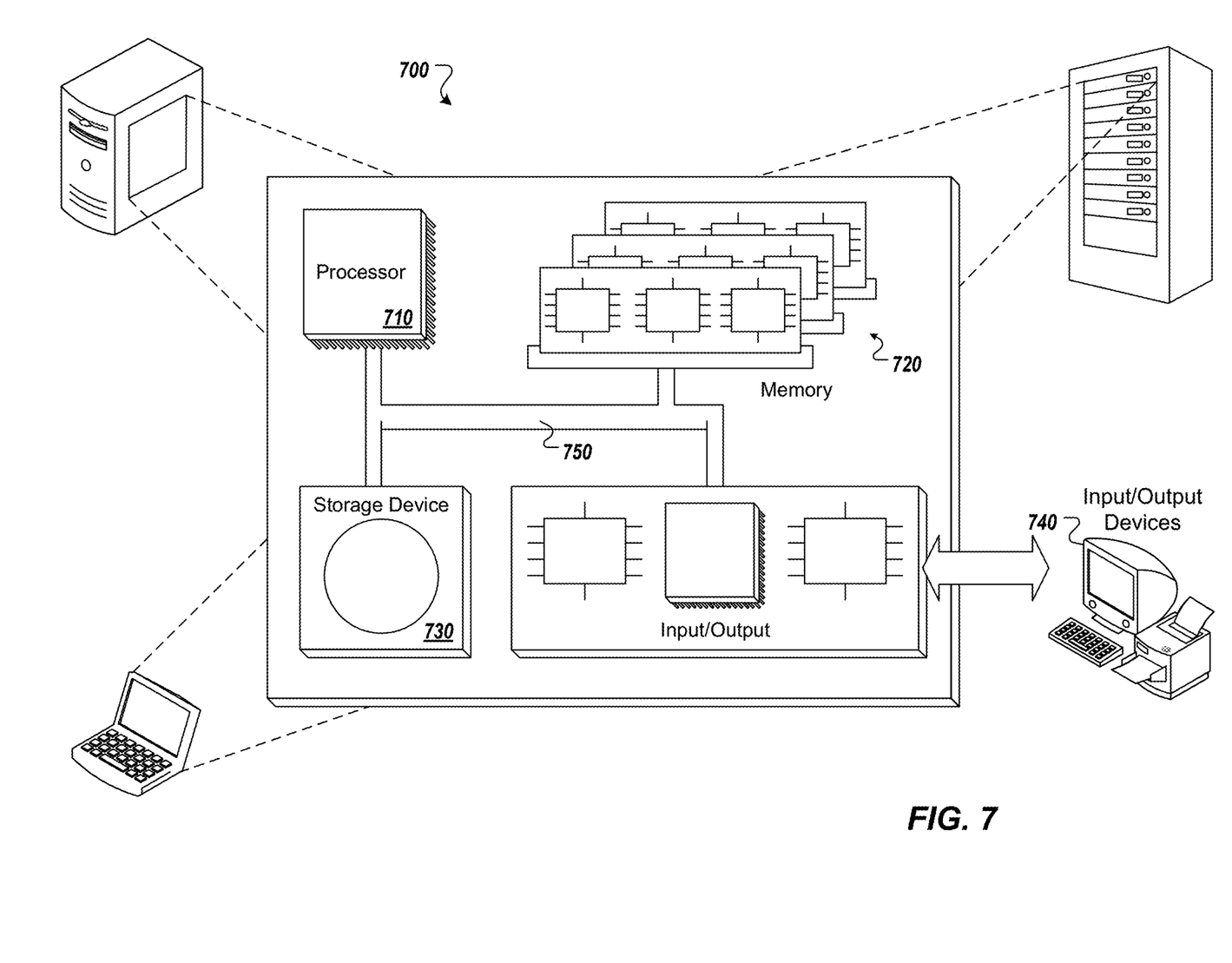
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In some implementations, the memory 720 is a volatile memory unit. In some implementations, the memory 720 is a non-volatile memory unit. The storage device 730 is capable of providing mass storage for the system 700. In some implementations, the storage device 730 is a computer-readable medium. In some implementations, the storage device 730 may be a floppy disk device, a hard disk device, an optical disk device, or a tape device. The input/output device 740 provides input/output operations for the system 700. In some implementations, the input/output device 740 includes a keyboard and/or pointing device. In some implementations, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for time- and resource-efficient execution of data model extensions to provide runtime data objects, the method being executed by one or more processors and comprising:
   receiving, by a parser, a view source file and an extension source file, the view source file defining a view on data stored in a database, the extension source file defining an extension to the view;
   parsing, by the parser, the view source file to provide a view abstract syntax tree (AST) and the extension source file to provide an extension AST, the extension AST comprising at least one node that is absent from the view AST;
   providing, by the parser, a merged AST by merging the view AST and the extension AST, the merged AST comprising the at least one node that is absent from the view AST;
   generating a mixed runtime data object using the merged AST; and
   providing the mixed runtime data object for consumption by at least one runtime component.

2. The method of claim 1, wherein the mixed runtime data object comprises at least one runtime data object entry and a query view.

3. The method of claim 1, wherein generating a mixed runtime data object is executed by a data dictionary of an application server.

4. The method of claim 1, further comprising storing the merged AST and the mixed runtime data object in a database system.

5. The method of claim 1, further comprising:
executing an application including the at least one runtime component using the merged AST and the runtime data object at an application server; and
receiving, by presentation logic, a result from the application server.

6. The method of claim 1, further comprising merging, by the parser, the extension AST into the view AST to provide the merged AST.

7. The method of claim 6, wherein merging comprises:
identifying a node on the view AST syntactically based on the extension AST; and
merging the extension AST into the view AST the through the identified node to derive the merged AST.

8. A non-transitory computer-readable storage medium coupled to one or more processors and having instructions stored thereon which, when executed by the one or more processors, cause the one or more processors to perform operations for time- and resource-efficient execution of data model extensions to provide runtime data objects, the operations comprising:
receiving, by a parser, a view source file and an extension source file, the view source file defining a view on data stored in a database, the extension source file defining an extension to the view;
parsing, by the parser, the view source file to provide a view abstract syntax tree (AST) and the extension source file to provide an extension AST, the extension AST comprising at least one node that is absent from the view AST;
providing, by the parser, a merged AST by merging the view AST and the extension AST, the merged AST comprising the at least one node that is absent from the view AST;
generating a mixed runtime data object using the merged AST; and
providing the mixed runtime data object for consumption by at least one runtime component.

9. The computer-readable storage medium of claim 8, wherein the mixed runtime data object comprises at least one runtime data object entry and a query view.

10. The computer-readable storage medium of claim 8, wherein generating a mixed runtime data object is executed by a data dictionary of an application server.

11. The computer-readable storage medium of claim 8, wherein operations further comprise storing the merged AST and the mixed runtime data object in a database system.

12. The computer-readable storage medium of claim 8, wherein operations further comprise:
executing an application including the at least one runtime component using the merged AST and the runtime data object at an application server; and
receiving, by presentation logic, a result from the application server.

13. The computer-readable storage medium of claim 8, wherein operations further comprise merging, by the parser, the extension AST into the view AST to provide the merged AST.

14. The computer-readable storage medium of claim 13, wherein merging comprises:
identifying a node on the view AST syntactically based on the extension AST; and
merging the extension AST into the view AST the through the identified node to derive the merged AST.

15. A system, comprising:
a processor; and
a computer-readable storage device coupled to the processor and having instructions stored thereon which, when executed by the computing device, cause the processor to perform operations for time- and resource-efficient execution of data model extensions to provide runtime data objects, the operations comprising:
receiving, by a parser, a view source file and an extension source file, the view source file defining a view on data stored in a database, the extension source file defining an extension to the view;
parsing, by the parser, the view source file to provide a view abstract syntax tree (AST) and the extension source file to provide an extension AST, the extension AST comprising at least one node that is absent from the view AST;
providing, by the parser, a merged AST by merging the view AST and the extension AST, the merged AST comprising the at least one node that is absent from the view AST;
generating a mixed runtime data object using the merged AST; and
providing the mixed runtime data object for consumption by at least one runtime component.

16. The system of claim 15, wherein the mixed runtime data object comprises at least one runtime data object entry and a query view.

17. The system of claim 15, wherein generating a mixed runtime data object is executed by a data dictionary of an application server.

18. The system of claim 15, wherein operations further comprise storing the merged AST and the mixed runtime data object in a database system.

19. The system of claim 15, wherein operations further comprise:
executing an application including the at least one runtime component using the merged AST and the runtime data object at an application server; and
receiving, by presentation logic, a result from the application server.

20. The system of claim 15, wherein operations further comprise merging, by the parser, the extension AST into the view AST to provide the merged AST.

* * * * *